United States Patent
Dey et al.

(10) Patent No.: US 11,062,183 B2
(45) Date of Patent: Jul. 13, 2021

(54) SYSTEM AND METHOD FOR AUTOMATED 3D TRAINING CONTENT GENERATION

(71) Applicant: Wipro Limited, Bangalore (IN)

(72) Inventors: Aditi Dey, Bengaluru (IN); Raymond Dixon John Francis Regis, Chennai (IN)

(73) Assignee: Wipro Limited, Bangalore (IN)

(*) Notice: Subject to any disclaimer, the term of this patent is extended or adjusted under 35 U.S.C. 154(b) by 72 days.

(21) Appl. No.: 16/505,738

(22) Filed: Jul. 9, 2019

(65) Prior Publication Data
US 2020/0372291 A1    Nov. 26, 2020

(30) Foreign Application Priority Data
May 21, 2019  (IN) ............... 201941020159

(51) Int. Cl.
  *G06K 9/00*  (2006.01)
  *G06K 9/62*  (2006.01)
  *G06N 20/00*  (2019.01)
  *G06N 3/08*  (2006.01)

(52) U.S. Cl.
  CPC ......... *G06K 9/628* (2013.01); *G06K 9/00201* (2013.01); *G06K 9/6232* (2013.01); *G06N 3/08* (2013.01); *G06N 20/00* (2019.01)

(58) Field of Classification Search
  CPC .......... H04N 13/0239; H04N 13/0082; H04N 7/0145; G06T 2207/10012; G06T 7/0075; G06T 7/0022; G06F 17/30249; G06N 99/005; G06K 9/66; G06K 9/6254; G06K 9/6255; G06K 9/4628; G06K 9/32;
  (Continued)

(56) References Cited

U.S. PATENT DOCUMENTS

| 7,889,914 B2 | 2/2011 | Regli et al. |
| 9,773,302 B2 | 9/2017 | Wang et al. |
| 9,947,102 B2 * | 4/2018 | Xu ................. G06T 7/0012 |

(Continued)

FOREIGN PATENT DOCUMENTS

CN  104185008 A  12/2014

OTHER PUBLICATIONS

Qin, F., et al., "A Deep learning approach to the classification of 3D CAD models", SpringerLink, (Abstract), Feb. 2014, vol. 15, Issue 2, pp. 91-106.

*Primary Examiner* — Amir Alavi
(74) *Attorney, Agent, or Firm* — Finnegan, Henderson, Farabow, Garrett & Dunner, LLP (57) ABSTRACT

System and method of facilitating generation of 3D training content is disclosed. In one embodiment, the method may include classifying a 3D model to determine the one or more objects associated with the 3D model by implementing a machine learning model. The classification of the 3D model includes analysis of the 3D model and extraction of feature set for the one or more objects in the 3D model in order to determine a class and a tag for the one or more objects in the 3D model. The method may further include assigning the class and the tag to the one or more objects in the 3D model. The method may further include assigning one or more functionalities to the objects based on the at least one tag, and creating a 3D training content by using the objects assigned with the at least one tag and the one or more functionalities.

9 Claims, 6 Drawing Sheets

(58) Field of Classification Search
CPC .... G06K 9/2013; G06K 9/344; G06K 9/6216; G06K 9/00228; G06K 9/628; G06K 9/6232

See application file for complete search history.

(56) References Cited

U.S. PATENT DOCUMENTS

| | | | |
|---|---|---|---|
| 9,965,863 B2* | 5/2018 | Xu | G06T 7/0012 |
| 10,108,902 B1* | 10/2018 | Lockett | G06N 3/0445 |
| 10,163,003 B2* | 12/2018 | Chen | G06K 9/4628 |
| 10,282,663 B2* | 5/2019 | Socher | G06F 30/00 |
| 10,380,788 B2* | 8/2019 | Martinez | G06T 3/4046 |
| 10,474,160 B2* | 11/2019 | Huang | G06T 3/40 |
| 10,592,747 B2* | 3/2020 | Beall | G06T 19/003 |
| 10,595,006 B2* | 3/2020 | Lee | H04N 13/271 |
| 2016/0379405 A1 | 12/2016 | Baca et al. | |
| 2020/0125709 A1* | 4/2020 | Gentry | G06F 16/5866 |
| 2020/0242849 A1* | 7/2020 | Cini | G06T 19/20 |
| 2020/0258227 A1* | 8/2020 | Liao | G06T 7/30 |

* cited by examiner

SYSTEM AND METHOD FOR AUTOMATED 3D TRAINING CONTENT GENERATION

TECHNICAL FIELD

This disclosure relates generally to facilitate the generation of 3D training content, and more particularly to a system and a method of automated 3D training content generation.

BACKGROUND

Three-Dimensional (3D) content based training platform has been known in industries such as manufacturing, automobile and the like, where employees and trainees are provided with content based training. These 3D content based training platforms have been using web-based applications that can employ Augmented Reality (AR) or Virtual Reality (VR) platform for delivering a training content.

However, the generation of training content for a machinery based on a 3D model requires interaction with the content developers for meticulously creating a 3D model replica of the actual machinery around which the training content must be designed. The 3D model replicas include the various components that are part of the actual machinery used in the industries. Further, the creation of the 3D model and the subsequent generation of training content for the 3D model is a costly as well as time consuming process because it requires introducing inherent details to be simulated into the training content. Therefore, the process of generating the training content from scratch for every new 3D model is a repetitive work and it requires complete generation cycle from scratch even when the 3D models are similar which makes the system inefficient. For example, for a model such as a car, different models of a car will have some similar features like tire, engine, oil filters in automobile industries; and piston, cylinder, piston brush in pneumatic-hydraulic machines in manufacturing industries.

There are existing techniques of product demonstration that includes a demonstrator explaining one or more functionalities of their product, while their voice and instructions data are captured and displayed to the users on a display unit. However, the existing techniques of generating the training content on single window of a display unit does not allow the demonstrator to refer back to the steps or content.

Therefore, creating a 3D training content for a 3D model while manually tagging the parts and assigning inherent details to the parts for every 3D model separately is very cumbersome and repetitive process. In addition to that, there are no efficient or cost effective techniques that can implement machine learning models to understand and identify the parts of 3D models for any type of machinery.

SUMMARY

In one embodiment, a method of generating a 3D training content is disclosed. In one example, the method may include classifying a 3D model based on a feature set associated with one or more objects associated with the 3D model by using a pre-trained machine learning model. The method may further include assigning, by the 3D content generation system, a class and at least one tag to the one or more objects based on the pre-trained ML model. The method may further include assigning, by the 3D content generation system, one or more functionalities to the one or more objects based on the at least one tag assigned to the one or more objects. The method may further include creating, by the 3D content generation system, the 3D training content for the 3D model by using the one or more objects in the 3D model assigned with the at least one tag and the one or more functionalities.

In another embodiment, a 3D content generation system is disclosed. In one example, the 3D content generation system may include at least one processor and a memory communicatively coupled to the at least one processor. The memory may store processor-executable instructions, which, on execution, may cause the processor to classify a 3D model based on a feature set associated with one or more objects associated with the 3D model by using a pre-trained machine learning model. The processor-executable instructions, on execution, may further cause the processor to assign a class and at least one tag to identify the one or more objects based on the pre-trained ML model. The processor-executable instructions, on execution, may further cause the processor to assign one or more functionalities to the one or more objects based on the at least one tag assigned to the one or more objects. The processor-executable instructions, on execution, may further cause the processor to create the 3D training content for the 3D model by using the one or more objects in the 3D model assigned with the at least one tag and the one or more functionalities.

In yet another embodiment, a non-transitory computer-readable medium storing processor-executable instructions is disclosed. In one example, the processor-executable instructions, when processed by at least one processor, cause a 3D content generation system to perform operations comprising classifying a 3D model based on a feature set associated with one or more objects associated with the 3D model by using a pre-trained Machine Learning (ML) model; assigning a class and at least one tag to identify the one or more objects based on the pre-trained ML model; assigning one or more functionalities to the one or more objects based on the at least one tag assigned to the one or more objects; and creating the 3D training content for the 3D model by using the one or more objects in the 3D model assigned with the at least one tag and the one or more functionalities.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
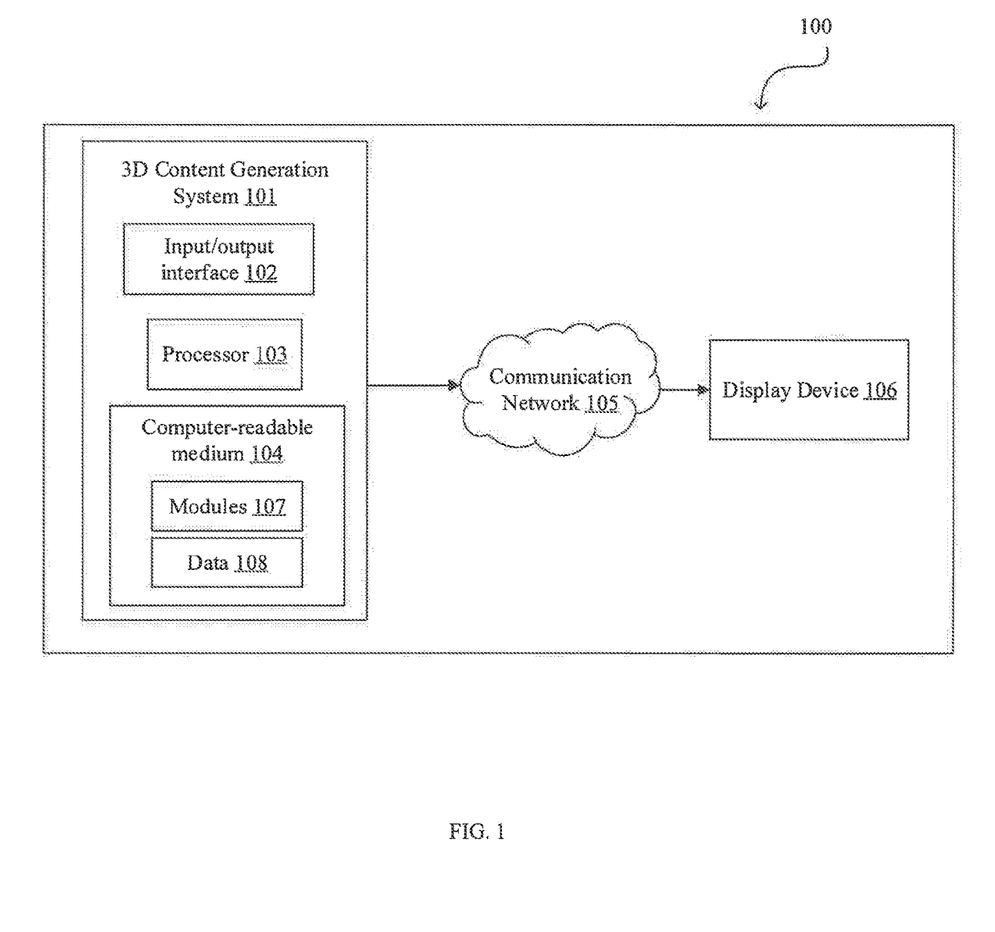
FIG. 1 illustrates an exemplary system corresponding to a 3D content generation system in accordance with some embodiments of the present disclosure.

Referring now to FIG. 1, a block diagram of an exemplary system 100 for generating a 3D training content is illustrated, in accordance with some embodiments of the present disclosure. The 3D content generation system 101 may include, but may not be limited to server, desktop, laptop, notebook, netbook, smartphone, and mobile phone. In particular, 3D content generation system 101 may include input/output interface 102, at least one processor 103, and a computer-readable medium (e.g. a memory) 104. The computer-readable storage medium 104 may include various modules 107 that may store the instructions that, when executed by the at least one processor 103, cause the at least one processor 103 to perform various functions in order to generate the 3D training content, in accordance with aspects of the present disclosure. The computer-readable storage medium 104 may also store various data 108 that may be captured, processed, and/or required by 3D content generation system 101 for generating the 3D training content. The 3D content generation system 101 may interact with a content developer (not shown) via input/output interface 102, for example, for receiving a 3D model input from the content developer for generating the 3D training content. The 3D content generation system 101 may further interact with a display device 106, via the communication network 105 for providing the 3D training content to the users for training and learning purpose.

In particular, the system 100 includes a 3D content generation system 101 that implements a pre-trained machine learning model for facilitating the generation of 3D training content for a 3D model. In an embodiment, the 3D training content is delivered to the users while providing an application or web based training with regard to the 3D model associated with a machinery and its working. In an embodiment, the 3D training content includes illustrations of 3D model replicas of the machinery. The 3D content generation system 101 includes classifying a 3D model and determining one or more objects in the 3D model. The pre-trained machine learning model allows the 3D content generation system 101 to determine a class and at least one tag for the one or more objects in the 3D model. The 3D content generation system 101 includes assigning the class and the at least one tag to the one or more objects in the 3D model based on the pre-trained machine learning model. The 3D content generation system 101 further includes assigning one or more functionality to the one or more objects in the 3D model based on the at least one tag assigned to the one or more objects. At last, the 3D content generation system 101 includes creating the 3D training content by using the one or more objects in the 3D model assigned the at least one tag and the one or more functionalities.

Figure 2A:
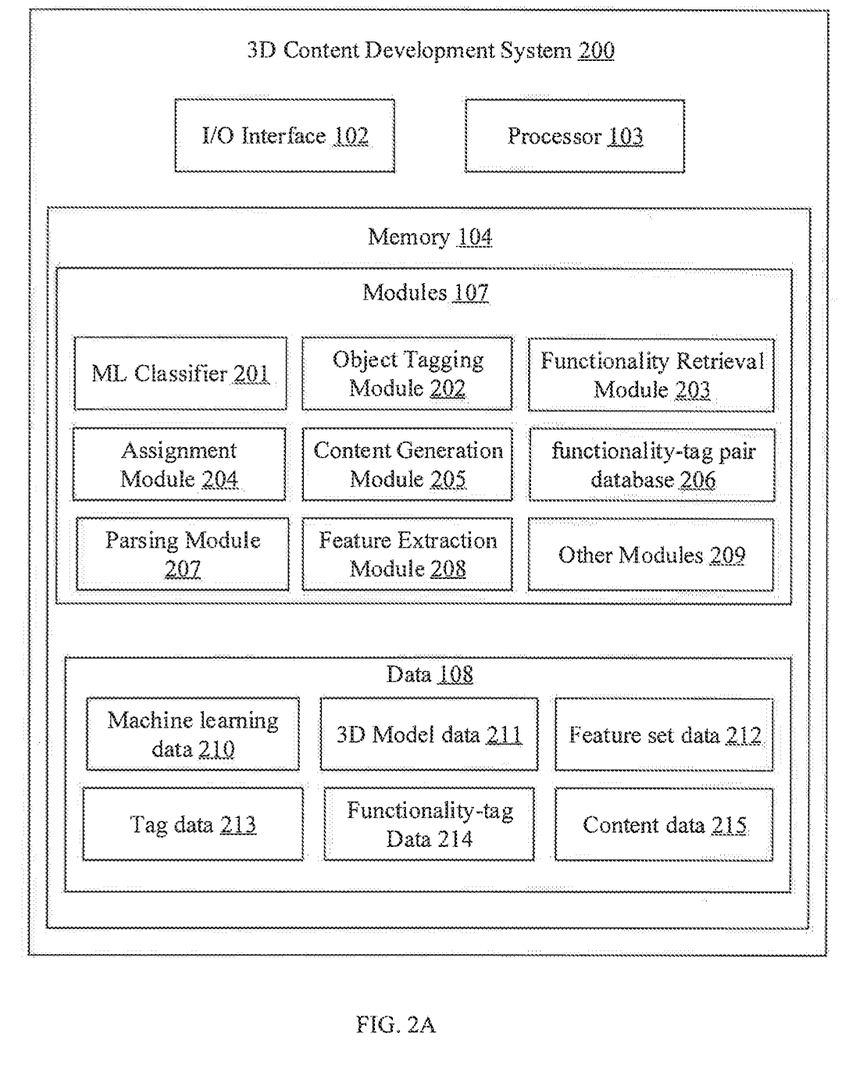
FIG. 2A is a block diagram illustrating components of a 3D content generation system in accordance with some embodiments of the present disclosure.

Referring now to FIG. 2A, a block diagram of a 3D content generation system 200 is illustrated, in accordance with some embodiments of the present disclosure. In particular, 3D content generation system 200 may include input/output interface 102, at least one processor 103, and a computer-readable medium (for example a memory) 104. The 3D content generation system 200 may include various modules 107 that perform various functions for facilitating the generation of the 3D training content for a content developer. In some embodiments, the 3D content generation system 200 may include a ML classifier 201, an object tagging module 202, a functionality retrieval module 203, an assignment module 204, a content generation module 205 and a functionality-tag pair database 206. In addition to above, in some embodiment, the 3D content generation system 200 may include a parsing module 207, a feature extraction module 208, and other modules 209 to perform various functions for facilitating the generation of the 3D training content for a content developer. In some embodiment, the 3D content generation system 200 may store various data 108 in the computer readable medium (for example memory) 104 (for example machine learning data 210, 3D model data 211, feature set data 212, tag data 213, functionality-tag data 214, content database 215, and the like) that may be captured, processed, and/or required for generating the 3D training content. As will be appreciated by those skilled in the art, all such aforementioned modules and databases 201-209 may be represented as a single module or a combination of different modules. Moreover, as will be appreciated by those skilled in the art, each of the modules and databases 201-209 may reside, in whole or in parts, on one device or multiple devices in communication with each other.

As will be described in greater detail in conjunction with FIGS. 2B, 2C and 2D, the 3D content generation system 200 may receive the 3D model as an input by a user (say content developer) for generating the 3D training content for the 3D model associated via input/output interface 102A. The 3D model consists of one or more 3D digital files such as CAD files or other proprietary design files that represents the machinery in virtual form.

Figure 2B:
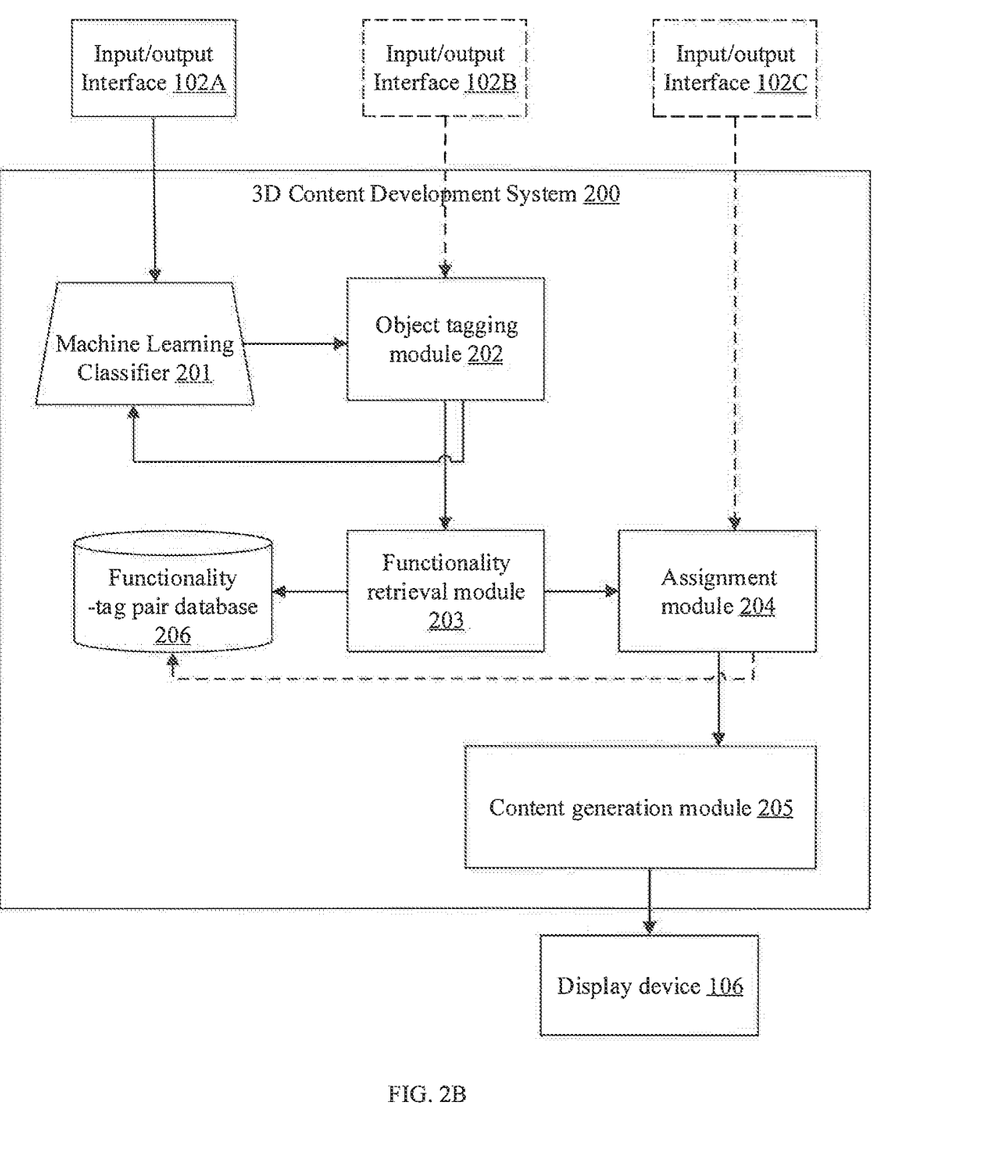
FIG. 2B is a functional block diagram of a 3D content generation system, in accordance with some embodiments of the present disclosure.

FIG. 2B is a functional block diagram of 3D content generation system 200, in accordance with the embodiments of present disclosure. The 3D content generation system 200 may perform a classification of the 3D model, imported by the content developer, in real-time to determine the class and the at least one tag for the one or more objects associated with the 3D model by using the ML Classifier 201. The ML classifier 201 implements the pre-trained machine learning model for classifying 3D models. The classification of the 3D model is based on a feature set comparison of the one or more objects in the 3D model, as explained below in more detail with the help of FIG. 2C. The 3D content generation system 200 includes the object tagging module 202 that assigns the class and the at least one tag determined for the one or more objects in the 3D model by the ML classifier 201. In some embodiments, the object tagging module 202 may evaluate the performance of the ML classifier 201. If the accuracy of the ML classifier is above a threshold, and the at least one tag identified for each of the one or more object is assumed correct, the object tagging module 202 can automatically assign the class and the at least one tag to the one or more objects. In some other embodiments, the object tagging module 202 may allow the content developer to manually assign class and a tag for the one or more objects. In an additional embodiment, if any object in the 3D model have been determined with incorrect class, incorrect tag or no tag, the 3D content generation platform 200 may allow the content developer to manually annotate a class and/or at least one tag for such objects. The newly entered class or tag can be assigned to the one or more objects by the object tagging module 202 based on the input from the content developer. In an embodiment, the newly assigned class or tag may be updated in a database associated with the ML classifier 201 and thus may be used by the ML classifier 201 for next iteration.

Further, the functionality retrieval module 203 in the 3D content generation platform 200 may receive the one or more objects in the 3D model from the object tagging module 202. The functionality retrieval module 203 retrieves the one or more functionalities for the one or more objects in the 3D model from the functionality-tag pair database 206. The one or more functionalities along with the tags list for the one or more objects are provided to the assignment module 204. The assignment module 204 assigns the one or more functionalities to the one or more objects in the 3D model based on the at least one tag. The assignment of the one or more functionalities is further explained below with the help of FIG. 2D. In some embodiments, the 3D content generation system 200 allows the content developer to validate the assigned functionalities provided to the assignment module 204. In an additional embodiment, the assignment module 204 may further allow the content developer to manually assign functionality for any object in the 3D model that have been incorrectly assigned or unassigned. The newly assigned functionality is further updated in the functionality-tag pair database 206 for further use. In such embodiments, the assignment module 204 may further provide each of the one or more objects assigned with the at least one tag and the newly assigned one or more functionalities to the content generation module 205 via interface 18 in order to create the 3D training content.

The assignment module 204 provides each of the one or more objects in the 3D model assigned with the at least one tag and the one or more functionalities to the content generation module 205 for generating the 3D training content. The 3D content generation platform further generates the 3D training content by the content generation module 205 by using the one or more objects in the 3D model assigned with the at least one tag and one or more functionalities. In an embodiment, a textual content or an AR content can be further added to the one or more objects in the 3D model along with the one or more functionalities to create 3D training content.

Figure 2C:
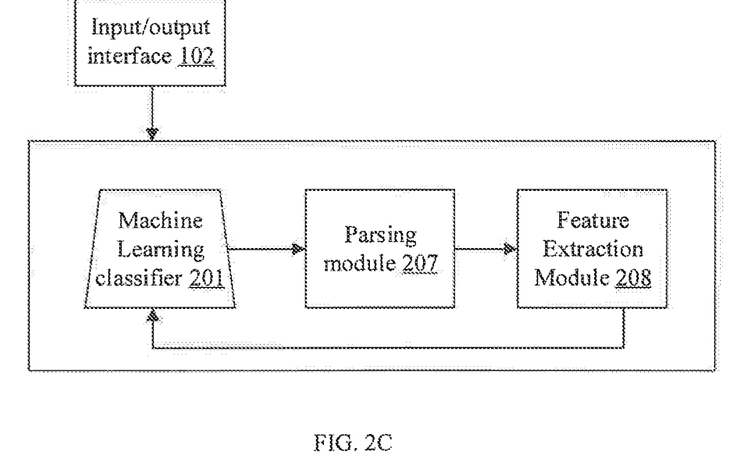
FIG. 2C is a block diagram illustrating components of a Machine Learning (ML) classifier corresponding to a 3D content generation system, in accordance with some embodiments of the present disclosure.

FIG. 2C is a functional block diagram of the ML classifier 201 corresponding to the 3D content generation system 200. The ML classifier 201 is configured to communicate with the parsing module 207 and the feature extraction module 208. The ML classifier 201 classifies the 3D model imported into the 3D content generation system 200 via input/output interface 102A by analyzing the 3D model and 3D model components. In a preferred embodiment, the classification of the 3D model requires the parsing module 207 to parse the 3D model into a hierarchical structure of the 3D model components to identify the one or more objects in the 3D model. The 3D model components includes a parent object and one or more child objects at subsequent levels determined by the pre-trained machine learning model implemented through the ML classifier 201. For example, at the topmost level of the hierarchy is the topmost category for example a car, a truck, and the like, while more complex and narrowed down category appear at lower levels of the hierarchy for example a tire, an engine, and the like. Further, the feature extraction module 208 is configured to extract the feature set associated with the 3D model components. The pre-trained machine learning model includes deep neural network that has trained the ML classifier 201 with the 3D model data. The ML classifier 201 classifies the 3D model based on the feature set extracted for the 3D model in real time that are used to identify the one or more objects associated with the 3D model. The feature set includes normalized features of the 3D model components extracted by a feature extraction technique. The 3D content generation system 200 can employ various feature extraction technique based on mesh vertex, color, shape, and the like. In an embodiment, the pre-trained machine learning model implements mesh information feature extraction technique to extract the feature set for the 3D model components. In an embodiment, the normalized features are the scaled features of the 3D model components that are used as a representation of the one or more objects in the 3D model. These feature set are fed to the pre-trained machine learning for further classification of the 3D model based on feature set comparison. Based on the classification, the ML classifier 201 determines the class of and at least one tag for the one or more objects associated with the 3D model.

The object tagging module 202 may receive the class and the at least one tag for the one or more objects in the 3D model. The class includes category of the 3D model associated with the actual machinery. The at least one tag includes one or more tags determined by the ML classifier 201 to identify the one or more objects in the 3D model. The object tagging module 202 allows the content developer to supervise the classification and tagging of the one or more objects in the 3D content generation system 200. If the ML classifier 201 accuracy is above a threshold, and the identified tag for each of the one or more object in the 3D model is correct, the content developer can accept the one or more tags determined by the ML classifier 201. Otherwise, the 3D content generation system 200 allows the content developer to manually annotate a class or a tag for the one or more objects that have been determined with incorrect class, incorrect tag or no tag via input/output interface 102B. The object tagging module 202 provides performance evaluation for the 3D content generation system 200 to ascertain the accuracy of the pre-trained machine learning model. In an embodiment, the newly assigned class or tag may be updated in the database associated with the ML classifier 201 to be used for next iteration.

Figure 2D:
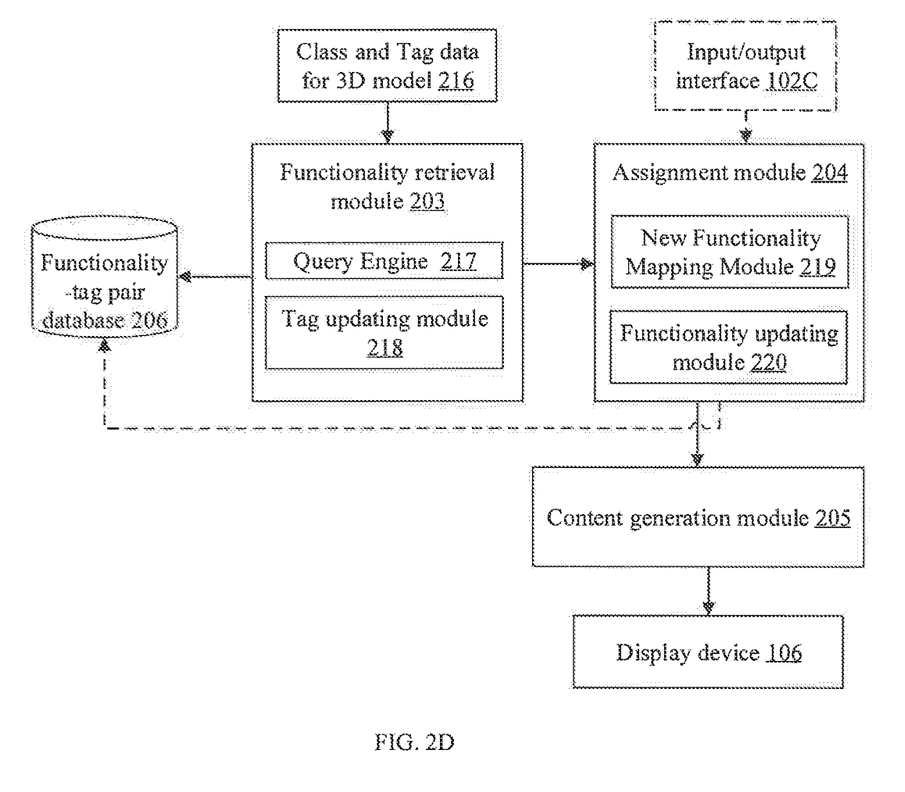
FIG. 2D is a block diagram of a functionality retrieval module and assignment module corresponding to a 3D content generation system, in accordance with some embodiments of the present disclosure

FIG. 2D is a block diagram illustrating the components of the functionality retrieval module 203 and the assignment module 204 in the 3D content generation system 200. As illustrated, the functionality retrieval module 203 may receive the class and tags data 216 for one or more objects in the 3D model. The functionality retrieval module 203 is configured to communicate with the functionality-tag pair database 206 that stores a plurality of pairs of a functionality mapped with a tag. The functionality retrieval module 203 queries the functionality-tag pair database 206 via a query engine 217 for a functionality based on the tag list provided for the one or more objects in the 3D model. The one or more functionalities retrieved from the functionality-tag pair database 206 is to be further assigned to the one or more objects based on the at least one tag assigned to the one or more objects. For any tag, if the query engine outputs no result, the tag updating module 218 stores the newly assigned tag in the functionality-tag pair database 206.

The 3D content generation system 200 includes the assignment module 204 that allows the content developer to verify the one or more functionalities retrieved for the one or more objects in the 3D model. The one or more functionalities retrieved by the functionality retrieval module 203 is now assigned to the one or more objects based on the at least one tag assigned to the one or more objects. The assignment module 204 assigns the one or more functionalities to the one or more objects in the hierarchy of a top-down fashion. In some embodiments, it might be possible that the functionality-tag pair database 206 does not have any functionality mapped to a tag and the functionality retrieval module 203 retrieves not output for its query. In such a case, the assignment module 204 may include a new functionality mapping module 219 that may allow the content developer to manually enter a functionality for such objects in the 3D model. The assignment module 204 can take input from the content developer with the help of input/output interface 102C. The newly assigned functionality is further stored by a functionality updating module 220 in the functionality-tag pair database 206 and mapped with the tag for further use.

In another embodiment, in case the functionality retrieval module 203 retrieves incorrect suggestion for functionality based on the tag, the assignment module 204 may allow the content developer to manually enter correct functionality for the such object. The assignment module 204 can take input from the content developer with the help of input/output interface 102C. The corrected functionality that was mapped to an existing tag can be further mapped to a completely new tag to assign to the one or more objects in the 3D model. The newly assigned functionality along with the tag is further updated by the functionality updating module 220 in the functionality-tag pair database 206 for further use.

The content generation module 205 receives each of the one or more objects in the 3D model components assigned with the at least one tag and one or more functionalities, as input. The content generation module 205 collates the one or more objects in the 3D model along with the associated data and create the 3D training content for the 3D model. The content generation module 205 may provide the 3D training content in executable form that can be delivered to the trainees during the application or web based training session via display device 106. The 3D training content includes visual presentation of the all the 3D model components along with their assigned functionality. In an embodiment, the content generation module 205 may allow adding textual or AR content to the one or more objects identified in the 3D model. In some embodiment, the content generation module 205 may allow creating additional textual document of the 3D training content containing each of the one or more objects in the 3D model along with the functionalities mapped with the tag. The executable form of 3D training content contains step-by-step instructions identifying the components in the 3D model by visually presenting each 3D components to the trainees. For example, the content generation module 205 may create a walkthrough of each of the one or more objects in the hierarchy and the one or more functionalities assigned to the one or more objects in the 3D model. The 3D training content may include guidance to the trainees to understand the functionalities and working of each of the 3D model components. The textual document of the 3D training content also contains the one or more objects along with the at least one tag and the one or more functionalities which is helpful as easy reference and minimizes the cost and time of creating a separate document file every time for each new 3D model.

It should be noted that the 3D content generation system 200 may be implemented in programmable hardware devices such as programmable gate arrays, programmable array logic, programmable logic devices, and so forth. Alternatively, the 3D content generation system 200 may be implemented in software for execution by various types of processors. An identified module of executable code may, for instance, include one or more physical or logical blocks of computer instructions which may, for instance, be organized as an object, procedure, function, or other construct. Nevertheless, the executables of an identified module need not be physically located together but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

Figure 3:
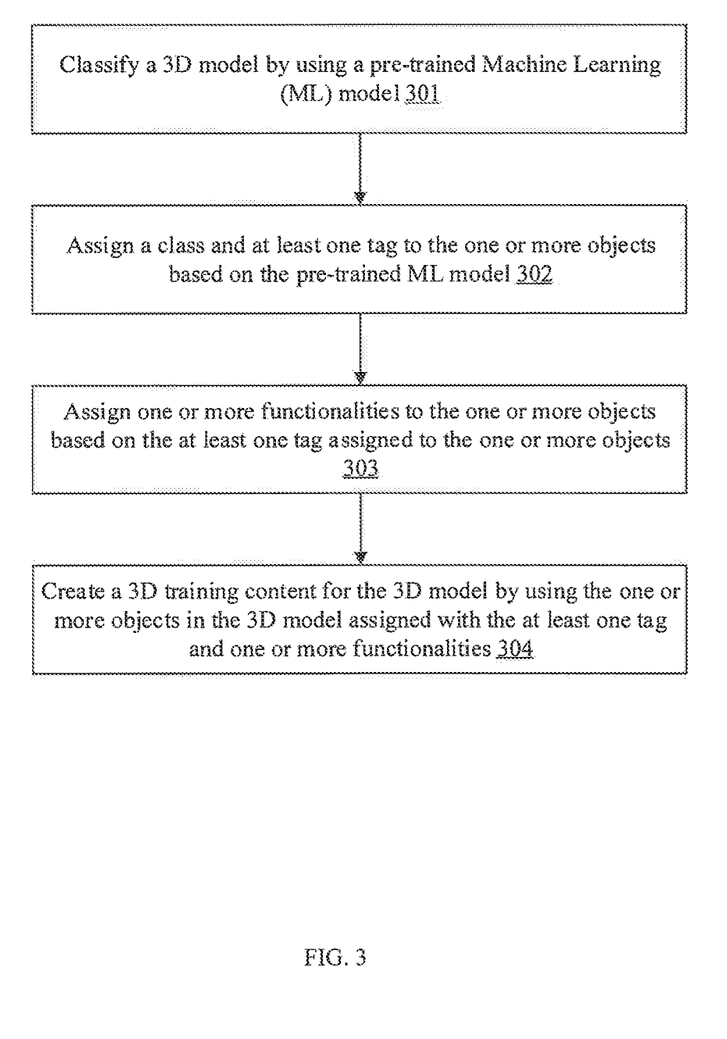
FIG. 3 is a flow diagram illustrating a process overview of generating a 3D training content, in accordance with some embodiments of the present disclosure.

Referring now to FIG. 3, a flow diagram of an exemplary process overview for automated generation of 3D training content by the 3D content generation system is depicted, in accordance with some embodiments of the present disclosure. A content developer imports a 3D model into the 3D content generation system for generation of 3D training content for the 3D model. As illustrated in the flowchart, a control logic 300 may include the step of classifying the imported 3D model based on a feature set associated with one or more objects associated with the 3D model by using a pre-trained Machine Learning (ML) model, at step 301. The control logic 300 may further include the step of assigning a class and at least one tag to the one or more objects based on the pre-trained Machine Learning (ML) model, at step 302. The control logic 300 may further include the step of assigning one or more functionalities to the one or more objects based on the at least one tag assigned to the one or more objects, at step 303. The control logic 300 may further include the step of creating the 3D training content for the 3D model by using the one or more objects in the 3D model assigned with the at least one tag and the one or more functionalities, at step 304.

In some embodiments, the control logic 300 may include one or more of following additional steps: determining a class and at least one tag for the one or more objects associated with the 3D model, in step 301 and manually annotating the class and at least one tag for the one or more objects, at step 302. In some other embodiments, the control logic 300 may include one or more of following additional steps: manually assigning functionality for the one or more objects in the 3D model, at step 303; and updating the functionality-tag pair database 206 with a newly assigned functionality for the one or more objects, at step 303.

At step 301, a 3D model imported by the content developer is classified by the ML classifier 201, which is pre-trained in classifying the 3D model. The ML classifier 201 will perform initial level of classification on the parent object of the 3D model of the model hierarchy and provide initial list of tags for the one or more objects in the 3D model. The classification of the 3D model further includes determining the class and the at least one tag for the one or more objects in the 3D model. In some embodiments, the classification of the 3D model includes parsing the 3D model to obtain the parent object and one or more child objects in the 3D model. In some embodiments, the classification of the 3D model further includes extracting the feature set associated with the one or more objects in the 3D model. The ML classifier 201 further classify the 3D model based on feature set comparison. The ML classifier 201 has implemented the pre-trained ML model and thus trained with synthetic data that classifies 3D models based on the pair of (feature set, object tag) to determine the class and the at least one tag for the one or more objects in the 3D model. In some embodiments, the feature set includes feature vector obtained using the pre-trained machine learning model for the 3D model. In some embodiments, the accuracy of the pre-trained machine learning model is ascertained by evaluating the class and the at least one tag determined for the one or more objects in the 3D model.

At step 302, an assignment of the class and the at least one tag to the one or more objects in the 3D model is performed based on the pre-trained machine learning model. In an embodiment, if the at least one tag identifying the one or more objects in the 3D model is correct, the object tagging module 202 can automatically accept the tag for the one or more objects in the 3D model. In some embodiments, the class and the at least one tag assigned by the object tagging module 202 may take input from the content developer to accept the at least one tag determined for the one or more objects or to modify or enter a class and/or a tag for the one or more objects that are assigned with incorrect class, incorrect tag or no tag. In such embodiments, if the one or more objects in the 3D model is identified with no tag or the at least one tag that is incorrect, the object tagging module 202 allows the content developer to manually enter a tag to identify the one or more objects in the 3D model. In an embodiment, the newly entered class or tag can be used to run next iteration of classification by the ML classifier 201 and to train the pre-trained machine learning model.

At step 303, the functionality retrieval module 203 queries a one or more functionalities from a database for tags assigned to the one or more objects in the 3D model. The functionality-tag pair database 206 consists of two entities i.e. tags and functionalities, wherein each tag can have one or more mapped functionalities. The output includes the one or more functionalities based on the tags list queried by the functionality retrieval module 203, which are then provided to the assignment module 204 for assigning to the one or more objects in the 3D model based on the at least one tag. In an embodiment, if the retrieved functionality is correct with for the tag value, the assignment module 204 may automatically assign the functionalities to the one or more objects in the 3D model based on the retrieved list.

In an embodiment, if the database does not output any functionality for the tag value, the assignment module 204 may allow the content developer to manually assign a functionality to such objects based on the at least one tag. The newly assigned functionality is stored in the database for the corresponding tag value and is available for subsequent iterations. In another embodiment, if the retrieved functionality is incorrect for the tag value, the assignment module 204 may allow the content developer to manually correct the assigned functionality to be mapped with the tag and assigned to an object based on the at least one tag. The modified functionality may be mapped with the existing tag and updated in the functionality-tag pair database 206 for further use.

At step 304, after the assignment of the at least one tag and the one or more functionalities for each of the one or more objects in the 3D model, a complete 3D training content for the 3D model is created. In an embodiment, the 3D training content can be in the form of executable file that is present to the trainees during application and web based training via display device 106. In some embodiments, the 3D training content include adding AR content to the one or more objects in the 3D model for better illustrations of the 3D model and the respective functionalities of each of the one or more in the 3D model. In some embodiments, the 3D training content further includes creating a textual document containing the one or more objects in the 3D model and the respective functionalities of each of the one or more objects in the 3D model. It should be noted that creating the 3D training content and additionally textual document minimizes the creation effort and time.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 4:
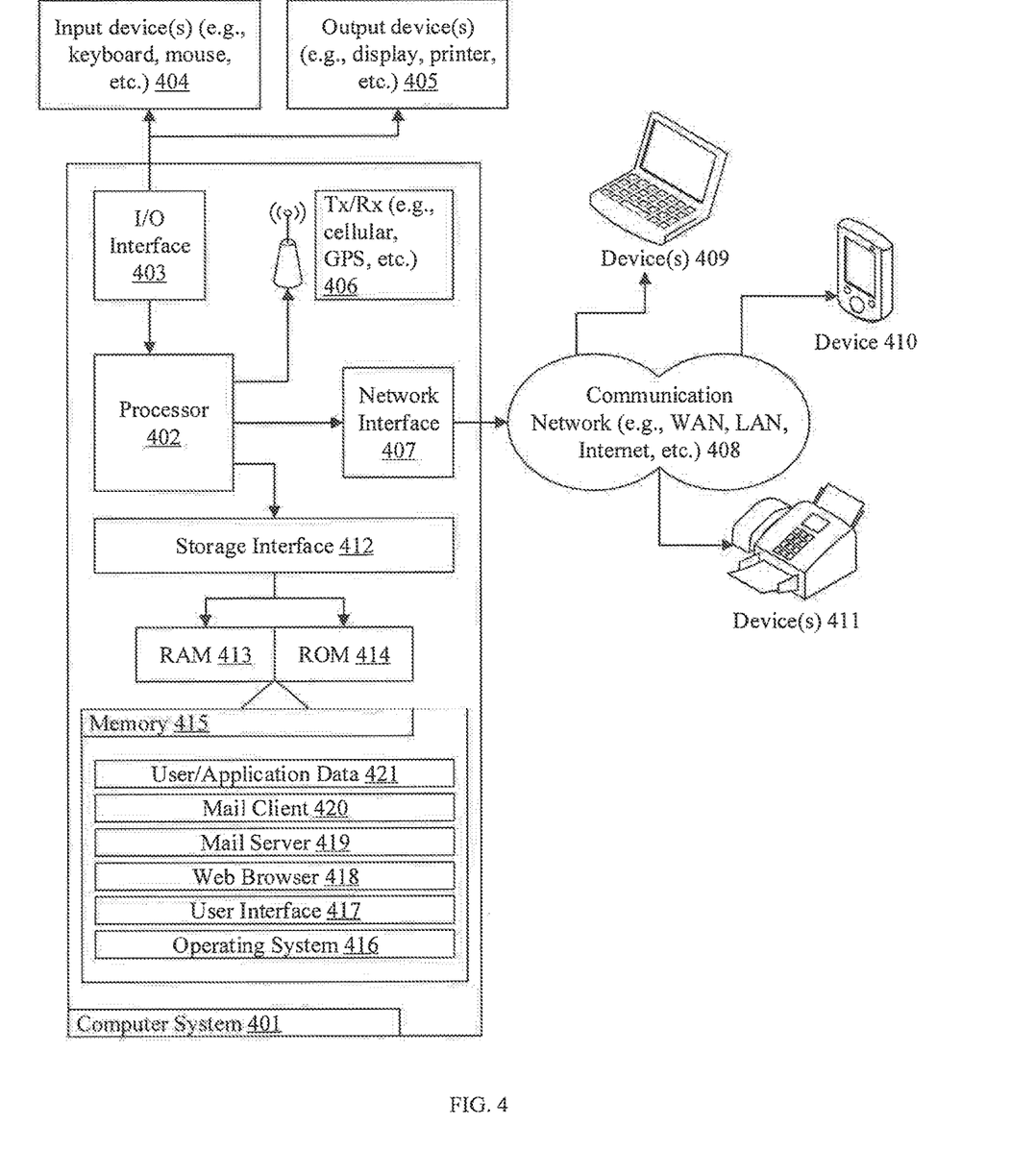
FIG. 4 is a block diagram of an exemplary computer system for implementing embodiments consistent with the present disclosure.

FIG. 4 is a block diagram of an exemplary computer system for implementing embodiments consistent with the present disclosure. Variations of computer system 401 may be used for implementing list all computers from other figures. Computer system 401 may comprise a central processing unit ("CPU" or "processor") 402. Processor 402 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 403 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 409, 410, and 411. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 401 may itself embody one or more of these devices.

In some embodiments, the processor 402 may be disposed in communication with one or more memory devices (e.g., RAM 413, ROM 414, etc.) via a storage interface 412. The storage interface may connect to memory devices 415 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives 415 may further include a drum, magnetic disc drive, magneto-optical drive, optical drive, redundant array of independent discs (RAID), solid-state memory devices, solid-state drives, etc.

The memory devices 415 may store a collection of program or database components, including, without limitation, an operating system 416, user interface application 417, web browser 418, mail server 419, mail client 420, user/application data 421 (e.g., any data variables or data records discussed in this disclosure), etc. The operating system 416 may facilitate resource management and operation of the computer system 401. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 401 may implement a web browser 418 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 401 may implement a mail server 419 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as Internet message access protocol (IMAP), messaging application programming interface (MAPI), Microsoft Exchange, post office protocol (POP), simple mail transfer protocol (SMTP), or the like. In some embodiments, the computer system 401 may implement a mail client 420 stored program component. The mail client may be a mail viewing application, such as Apple Mail, Microsoft Entourage, Microsoft Outlook, Mozilla Thunderbird, etc.

In some embodiments, computer system 401 may store user/application data 421, such as the data, variables, records, etc. (e.g., list here) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described application title. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable media may be utilized in implementing embodiments consistent with the present disclosure. A computer-readable medium refers to any type of physical memory on which information or data readable by a processor may be stored. Thus, a computer-readable medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

We claim:

1. A method of generating a three-dimensional (3D) training content, the method comprising:
   classifying, by a 3D content generation system, a 3D model, based on a feature set associated with one or more objects associated with the 3D model by using a pre-trained Machine Learning (ML) model, wherein classifying the 3D model further comprises:
   parsing the 3D model to determine the one or more objects in the 3D model;
   extracting the feature set for the one or more objects in the 3D model; and
   determining the class and the at least one tag for the one or more objects in the 3D model based on the feature set comparison for the one or more objects by the pre-trained ML model;
   assigning, by the 3D content generation system, a class and at least one tag to the one or more objects based on the pre-trained ML model;
   assigning, by the 3D content generation system, one or more functionalities to the one or more objects based on the at least one tag assigned to the one or more objects; and
   creating, by the 3D content generation system, the 3D training content for the 3D model by using the one or more objects in the 3D model assigned with the at least one tag and the one or more functionalities.

2. The method as claimed in claim 1, wherein the one or more objects in the 3D model comprises a parent object and one or more child objects in the 3D model.

3. The method as claimed in claim 1, further comprising training the pre-trained ML model by manually annotating the class and the at least one tag for the one or more objects in the 3D model.

4. The method as claimed in claim 1, wherein the pre-trained ML model comprises a deep neural network.

5. A three-dimensional (3D) content generation system for generating a 3D training content, the 3D content generation system comprising:
   a processor; and
   a memory communicatively coupled to the processor, wherein the memory stores processor-executable instructions, which, on execution, causes the processor to:
   classify a 3D model based on a feature set associated with one or more objects associated with the 3D model by using a pre-trained Machine Learning (ML) model, wherein classifying the 3D model further comprises:
   parsing the 3D model to determine the one or more objects in the 3D model;
   extracting the feature set for the one or more objects in the 3D model; and
   determining the class and the at least one tag for the one or more objects in the 3D model based on the feature set comparison for the one or more objects by the pre-trained ML model;
   assign a class and at least one tag to identify the one or more objects based on the pre-trained ML model;
   assign one or more functionalities to the one or more objects based on the at least one tag assigned to the one or more objects; and
   create the 3D training content for the 3D model by using the one or more objects in the 3D model assigned with the at least one tag and the one or more functionalities.

6. The system as claimed in claim 5, wherein the one or more objects in the 3D model comprises a parent object and one or more child objects in the 3D model.

7. The system as claimed in claim 5, wherein the processor-executable instructions further causes the processor to train the pre-trained ML model by manually annotating the class and the at least one tag for the one or more objects in the 3D model.

8. The system as claimed in claim 5, wherein the pre-trained ML model comprises a deep neural network.

9. A non-transitory computer-readable medium storing processor-executable instructions that when processed by at least one processor cause a computer to perform operations comprising:
   classifying a three-dimensional (3D) model based on a feature set associated with one or more objects associated with the 3D model by using a pre-trained Machine Learning (ML) model, wherein classifying the 3D model further comprises:
   parsing the 3D model to determine the one or more objects in the 3D model;
   extracting the feature set for the one or more objects in the 3D model; and
   determining the class and the at least one tag for the one or more objects in the 3D model based on the feature set comparison for the one or more objects by the pre-trained ML model;
   assigning a class and at least one tag to identify the one or more objects based on the pre-trained ML model;
   assigning one or more functionalities to the one or more objects based on the at least one tag assigned to the one or more objects; and
   creating the 3D training content for the 3D model by using the one or more objects in the 3D model assigned with the at least one tag and the one or more functionalities.

* * * * *